United States Patent
Chen et al.

[11] Patent Number: 5,988,966
[45] Date of Patent: Nov. 23, 1999

[54] ANTITHEFT DEVICE FOR USE WITH A BOLT

[76] Inventors: Antony Chen, No. 863, Chienhsing Rd., North Dist.; Han-Wey Chen, No. 99, Anshun N. 1st St., both of Taichung, Taiwan

[21] Appl. No.: 09/134,785

[22] Filed: Aug. 14, 1998

[51] Int. Cl.⁶ .............................. F16B 19/00; F16B 33/00
[52] U.S. Cl. .......................... 411/372; 411/373; 411/431; 411/910
[58] Field of Search ................................. 411/372, 373, 411/377, 429, 431, 908, 910

[56] References Cited

U.S. PATENT DOCUMENTS

| 3,881,391 | 5/1975 | Dereszynski | 411/373 X |
| 4,136,598 | 1/1979 | Hughes | 411/372 |
| 4,601,624 | 7/1986 | Hill | 411/373 |

FOREIGN PATENT DOCUMENTS

| 916941 | 1/1963 | United Kingdom | 411/373 |
| 1438171 | 6/1976 | United Kingdom | 411/373 |
| 2014680 | 8/1979 | United Kingdom | 411/910 X |

*Primary Examiner*—Neill Wilson
*Attorney, Agent, or Firm*—Patterson & Keough, P.A.

[57] ABSTRACT

An antitheft device includes a base member having an open top and a hole defined through the bottom thereof, a plurality of slots defined in the peripheral wall extending from the bottom and an annular flange extending radially and outwardly from the peripheral wall. A cap has an annular groove is defined in the inner periphery of the peripheral wall extending from the top so that the head portion of a bolt or a nut is received between the cap and the base member with the annular flange being engaged with the annular groove.

6 Claims, 3 Drawing Sheets

ANTITHEFT DEVICE FOR USE WITH A BOLT

FIELD OF THE INVENTION

The present invention relates to a device for use with a bolt and more particularly, to an antitheft device cooperated with a bolt or a nut so that the bolt or the nut can not be accessed if the device is employed.

BACKGROUND OF THE INVENTION

Conventionally, bolts are used to fixedly connect two objects by extending through the two objects and engaging it with a nut. In some situations, the bolts are not supposed to be disengaged easily, such as the bolts used to connect license plates to a car or to assemble casings in which products are displayed to public. In order to achieve an antitheft feature, some specially designed bolts and methods to employ the bolts have been developed. In one such case, the head portion of the special designed bolt is removed from the shank after the bolt extends through the objects. This requires special tool and is used in special situations. In normal situations and in order to conveniently use the bolts, the bolts and the nut are easily accessed so that they can also be disengaged from the objects by using a simple tool such as a wrench.

The present invention intends to provide an antitheft device which has a base member and a cap mountable to the base member so as to enclose the head portion and/or the nut therein. The present antitheft invention has arisen to mitigate and/or obviate the disadvantages of the conventional antitheft device.

SUMMARY OF THE INVENTION

In accordance with one aspect of the present invention, an antitheft device comprises a base member having an open top and a first hole defined through the bottom thereof and a plurality of slots defined in the peripheral wall extending from the bottom. The peripheral wall has an annular flange extending radially and outwardly therefrom. The cap has an annular groove is defined in the inner periphery of the peripheral wall extending from the top. The cap is connected to the base member to let the annular flange be engaged with the annular groove.

An object of the present invention is to provide an antitheft device which encloses the head portion of a bolt or a nut therein.

Another object of the present invention is to provide an antitheft device which is easily assembled but is not easily disassembled.

Yet another object of the present invention is to provide an antitheft device which has the function of distinguishing whether the object connected to the antitheft device has been accessed or not.

Further objects, advantages, and features of the present invention will become apparent from the following detailed description with appropriate reference to the accompanying drawings.

DETAILED DESCRIPTION OF THE PREFERRED EMBODIMENTS

Figure 1:
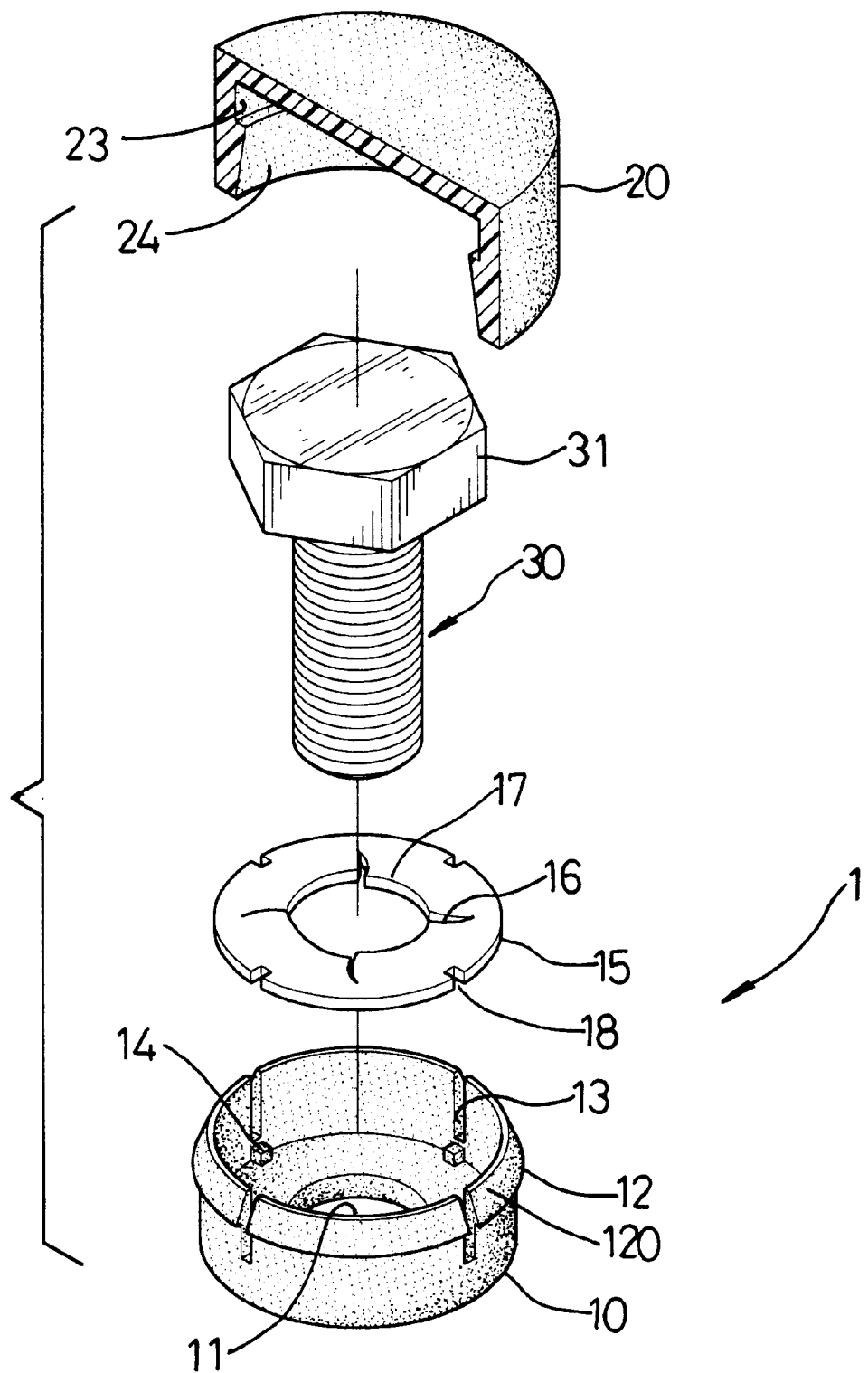
FIG. 1 is an exploded view of the antitheft device in accordance with the present invention.

Referring to FIG. 1, the antitheft device in accordance with the present invention comprises a base member 10 having an open top and a first hole 11 defined through the bottom thereof and four slots 13 defined in the peripheral wall extending from the bottom so that the peripheral wall is flexible. Four protrusions 14 extend from the bottom of the base member 10 and an annular flange 12 extends radially outward from the external peripheral wall of the base member 10. The annular flange 12 has a tapered outer periphery 120.

A cap 20 has an annular groove 23 is defined in the inner periphery of the peripheral wall extending from the top of the cap 20. A tapered inner periphery 24 is defined on the inner periphery of the peripheral wall of the cap 20 and located below the annular groove 23.

Figure 2:
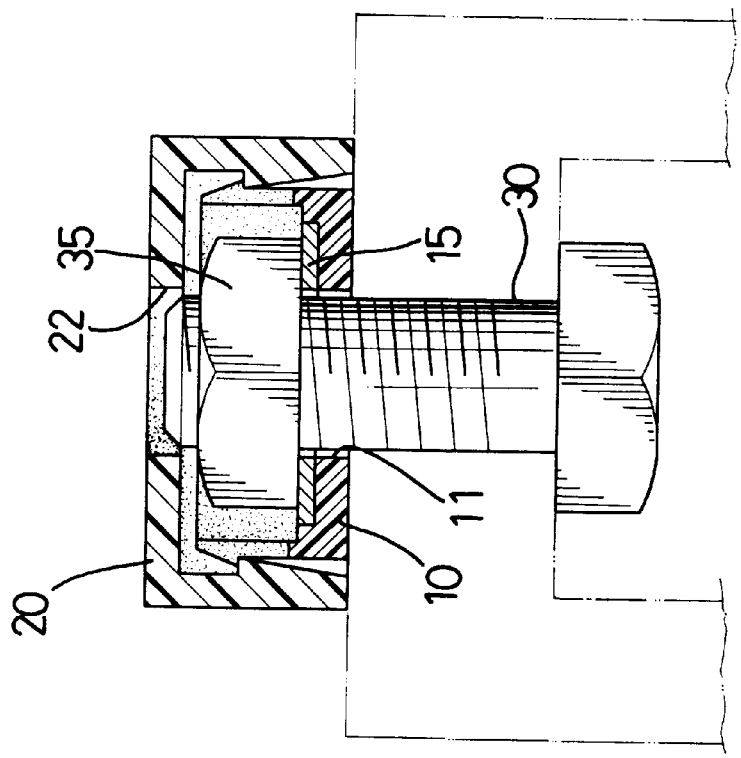
FIG. 2 is a side elevational view, partly in section, of the first embodiment of the antitheft device in accordance with the present invention.

A washer 15 rests on the bottom of the base member 10 and has four notches 18 defined along the periphery thereof so as to received the protrusions 14 of the base member 10 therein. Four slits 16 are defined radially in the inner periphery thereof so as to divide the inner periphery of the washer into four sections each of which is bent to form a convex portion 17 extending from one of two sides of the washer 15. Referring to FIG. 2, the bolt 30 extends through the inner periphery of the washer 15 and the first hole 11 of the base member 10, and the cap 20 is then mounted to the base member 10 by pushing the tapered inner periphery 24 of the cap 20 along the tapered outer periphery 120 of the annular flange 12 of the base member 10 to receive the annular flange 12 in the annular groove 23 of the cap 20. The head 31 of the bolt 30 is enclosed between the base member 10 and the cap 20, and the convex portion 17 provides a force to push the head portion 31 toward the cap 20.

Figure 3:
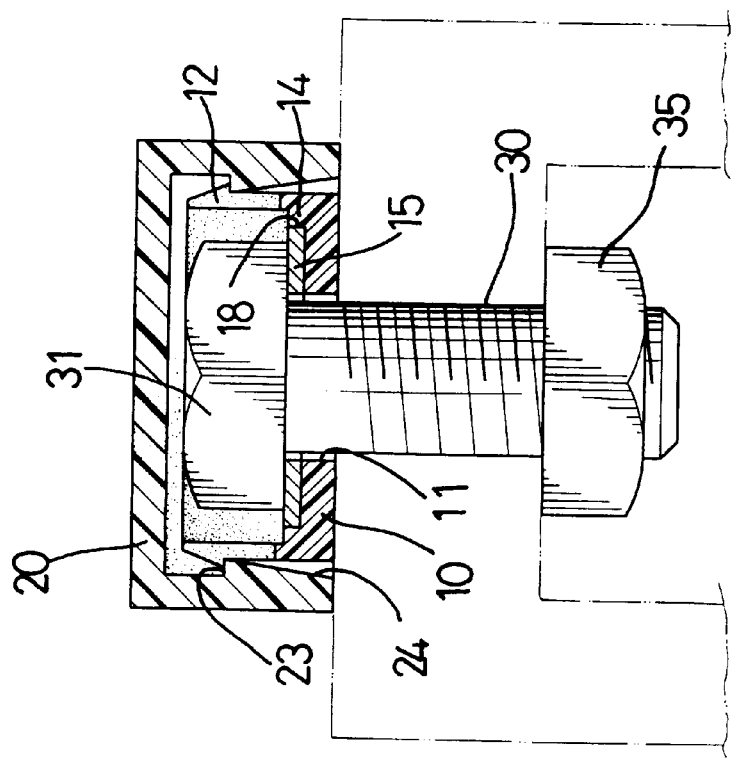
FIG. 3 is a side elevational view, partly in section, of a second embodiment of the antitheft device in accordance with the present invention.

FIG. 3 shows that the antitheft device is used to enclose the nut 35 wherein the bolt 30 extends through the first hole 11 of the base member 10 and toward the cap 20. The nut 35 is mounted to the bolt 30 and placed on the washer 15. The cap 20 further has a second hole 22 defined through the top thereof and is mounted to the base member 10 in the way described above so as to enclose the nut 35 between the base member 10 and the cap 20. It is to be noted that the second hole 22 defined in the cap 20 allows the shank of the bolt 30 to extend.

Figure 4:
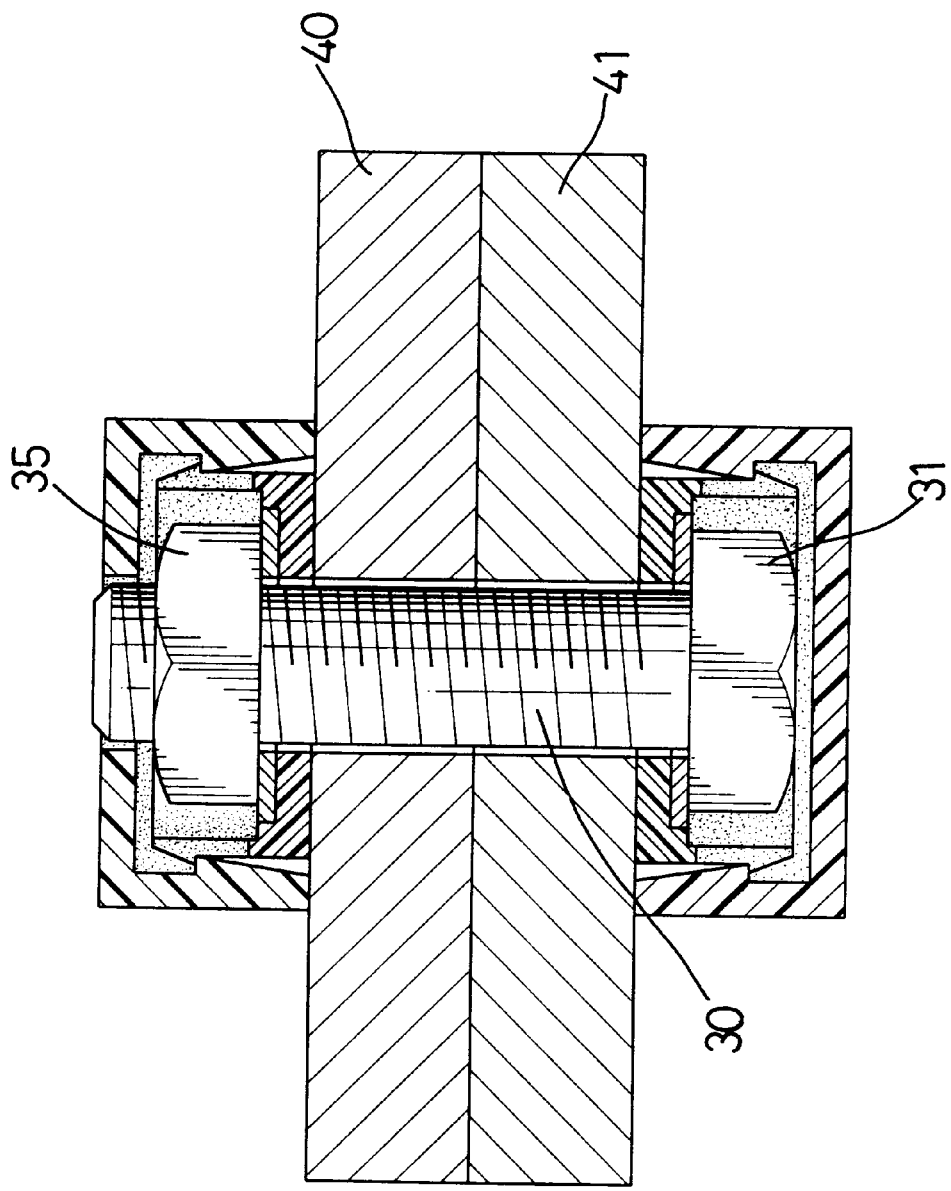
FIG. 4 is a side elevational view, partly in section, of a third embodiment of the antitheft device in accordance with the present invention.

FIG. 4 shows two boards 40, 41 held together by the bolt 30 and nut 35 combination. Two sets of the antitheft devices are used to respectively enclose the head portion 31 and the nut 35 therein. By the arrangement, both the head portion 31 and the nut 35 can not be accessed unless the antitheft devices are broken. It is to be noted that the cap 20 for enclosing the head portion 31 has no the second hole 22 so that moisture or dust does not enter the cap 20.

The base member 10 and the cap 20 can be easily manufactured of plastic material and the washer 15 can be made of metal so that the device is cheap but effective. The head portion 31 and/or the nut 35 are enclosed by the antitheft device so that they cannot be accessed except by breaking the device so that it will be obvious if the object connected to the antitheft device has been accessed. Once the device is broken, it has to be discarded, so that the antitheft device can be used as a security notification device.

Although the invention has been explained in relation to its preferred embodiment, it is to be understood that many other possible modifications and variations can be made without departing from the spirit and scope of the invention as hereinafter claimed.

What is claimed is:

1. An antitheft device comprising:

a base member having an open top with a peripheral wall extending from the bottom of said base member and a first hole defined through the bottom thereof, a plurality of slots defined in said peripheral wall extending from the bottom and a plurality of protrusions extending from the bottom of said base, an annular flange extending radially outward from said peripheral wall;

a washer resting on the bottom of said base member and having a plurality of notches defined along the periphery thereof so as to receive said protrusions therein, and a cap having a peripheral wall extending from the top thereof and an annular groove defined in the inner periphery of said peripheral wall of said cap so that said annular flange is engaged with said annular groove.

2. The antitheft device as claimed in claim 1 further comprising a plurality of convex portions extending from one of two sides of said washer.

3. The antitheft device as claimed in claim 2 further comprising a plurality of slits defined radially in the inner periphery thereof.

4. The antitheft device as claimed in claim 1 further comprising a tapered inner periphery defined in the inner periphery of the peripheral wall of said cap and located below said annular groove.

5. The antitheft device as claimed in claim 4, wherein said annular flange has a tapered outer periphery.

6. The antitheft device as claimed in claim 1, wherein said cap has a second hole defined through the top thereof.

* * * * *